US011120112B1

(12) United States Patent
Chen

(10) Patent No.: US 11,120,112 B1
(45) Date of Patent: Sep. 14, 2021

(54) BIOMETRICS AUTHENTICATION FOR SECURE ACCESS TO SYSTEM

(71) Applicant: United States of America as Represented by the Secretary of the Navy, Arlington, VA (US)

(72) Inventor: Liping Chen, Port Hueneme, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 45 days.

(21) Appl. No.: 16/585,285

(22) Filed: Sep. 27, 2019

Related U.S. Application Data

(60) Provisional application No. 62/737,824, filed on Sep. 27, 2018.

(51) Int. Cl.
*G06F 21/32* (2013.01)
*G06F 21/40* (2013.01)
*H04L 9/06* (2006.01)
*G06F 21/33* (2013.01)
*G06F 21/36* (2013.01)

(52) U.S. Cl.
CPC ............ *G06F 21/32* (2013.01); *G06F 21/33* (2013.01); *G06F 21/36* (2013.01); *G06F 21/40* (2013.01); *H04L 9/0643* (2013.01)

(58) Field of Classification Search
None
See application file for complete search history.

(56) References Cited

U.S. PATENT DOCUMENTS

| | | | |
|---|---|---|---|
| 10,264,986 B2 | 4/2019 | Galea | |
| 10,265,024 B2 | 4/2019 | Lee et al. | |
| 10,285,641 B2 | 5/2019 | Kang et al. | |
| 10,349,889 B2 | 7/2019 | Nousianinen | |
| 10,412,576 B2 | 9/2019 | Song et al. | |
| 2011/0012711 A1* | 1/2011 | Abe | G06Q 20/40145 340/5.82 |
| 2013/0138964 A1* | 5/2013 | Joyce, III | G06Q 20/40145 713/176 |
| 2013/0227651 A1* | 8/2013 | Schultz | H04L 63/0861 726/4 |
| 2015/0036893 A1* | 2/2015 | Shinzaki | H04L 9/3231 382/115 |
| 2015/0347734 A1* | 12/2015 | Beigi | G06F 21/32 713/155 |
| 2016/0098550 A1* | 4/2016 | Lam | G06F 21/6218 726/18 |
| 2018/0295129 A1* | 10/2018 | Kohli | H04L 63/0861 |

* cited by examiner

*Primary Examiner* — Arezoo Sherkat
(74) *Attorney, Agent, or Firm* — Dave A. Ghatt

(57) ABSTRACT

A three-factor authentication system for restricting and securing user-access to a system. The authentication system that includes a vein-image-capturing device for capturing and processing wrist-vein images. The unique biometric data is one factor of a three-factor authentication system, along with unique device identification data and a user PIN, all three used to validate and provide secure access to a user. This system can be used to restrict and provide secure access to information systems, physical spaces, personal computer devices, and any other device or system requiring controlled user access.

2 Claims, 3 Drawing Sheets

System 200

BIOMETRICS AUTHENTICATION FOR SECURE ACCESS TO SYSTEM

CROSS-REFERENCE TO RELATED APPLICATIONS

This application claims the benefit of U.S. Provisional Application No. 62/737,824, filed Sep. 27, 2018, which is incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to a biometric authentication system, more particularly, an authentication system that includes a wrist-worn apparatus, that uses wrist-vein images to perform a 3-factor authentication system for restricting and securing access to data, information systems, virtual and physical devices, physical locations and the like.

BACKGROUND

Access to many existing information systems require only a user name and password; a 1-factor authentication. Also known are 2-factor authentication methods that comprise of a Smart Card and a PIN. The primary weakness of this approach is that this 2-factor authentication strategy cannot verify whether a given user is actually the authorized individual or another individual who merely happens to be in possession of the authorized person's PIN and card, thus defeating the purpose of user authentication and secure access.

As a means to overcome this authentication flaw, biometric authentication technologies have been developed to be able to accurately determine the identity of a user. There is a variety of biometric authentication technologies currently available and/or under development for various applications. These technologies and their limitations include face-recognition technologies, fingerprint identification, retina/iris recognition, and voice analysis.

Each of the above-mentioned methods of biometric authentication has its drawbacks. For example, facial recognition technology is less adaptable for ruggedized mobile applications, and requires complex visualization and validation methodology. It is also subject to misidentification and spoofing.

Similarly, fingerprint identification is less adaptable for ruggedized mobile applications. Also, from a security standpoint, fingerprints are left everywhere making technology easier to spoof. Despite high confidence and broad acceptance, Madrid bombing subject misidentification suggests potential for error.

Retina/Iris scanning and identification technology is also less adaptable for ruggedized mobile applications, and requires an invasive scan. Regarding voice analysis, again, this technology is less adaptable for ruggedized, noisy environments, and mobile applications. Additionally, a recording may be used for spoofing. Thus, it is desired to have a 3-factor authentication method that includes a rugged, adaptable, and reliable biometric aspect.

SUMMARY

In one aspect, the invention is a three-factor authentication system for restricting and securing user-access to a system. In this aspect, the three-factor authentication system includes a vein-image-capturing device having a unique device identification number. The vein-image-capturing device includes a processor. The vein-image-capturing device captures a unique vein-image of a user and processes the unique vein-image to produce vein-image data. In this aspect, the three-factor authentication system also includes a computer to which user access is desired, and to which the vein-image data and said unique device identification number is transmitted from the vein-image capturing device. The computer includes an input device to receive a user PIN, inputted by a user. The three-factor authentication system further includes a remote database server having stored information therein. The remote database server communicates with the computer.

According to the invention, the computer transmits the unique vein-image data, the unique device identification number, and the user PIN to the remote database server. The remote database server has a registration authority. The registration authority uses the stored information to verify the transmitted unique vein-image data, unique device identification number, and user PIN. The authentication system also includes a certificate authority for storing, signing, and issuing digital certificates.

According to the invention, the certificate authority communicates with the registration authority, so that after the registration authority has verified the vein-image data, the unique device identification number, and the user PIN, the certificate authority issues a digital certificate to the computer, so that the user gains access to the computer and any associated information system, device, secured space, or the like.

BRIEF DESCRIPTION OF THE DRAWINGS

Other features will be apparent from the description, the drawings, and the claims.

DETAILED DESCRIPTION

Figure 1A:
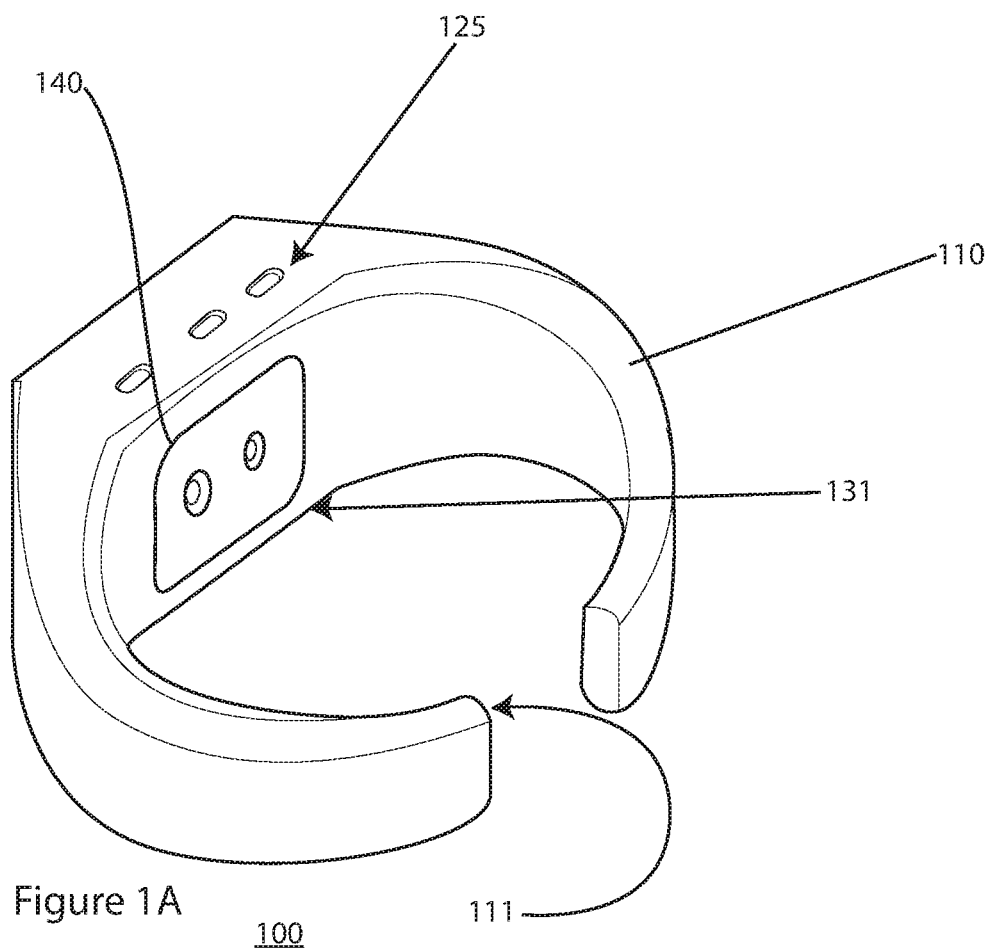
FIG. 1A is a perspective illustration of a vein-image-capturing device, according to an embodiment of the invention.

FIG. 1A is a perspective illustration of a vein-image-capturing device 100, according to an embodiment of the invention. The vein-image-capturing device 100 has the ability to capture unique vein images without a light source, which allows the device to be power efficient, resilient, and to operate quickly. As outlined below, the biometric information, i.e., the captured vein-images may be used as one factor of a three-factor authentication system for restricting and securing user-access to an information system, physical spaces, devices, and any other system requiring controlled user access. It should also be understood that each vein-image-capturing device 100 has a unique device identification number.

As shown in FIG. 1A, the vein-image capturing device 100 is a wrist-worn device. As shown, the device 100 includes a wristband 110 for securing the device to the wrist of a user. FIG. 1A shows the wristband 110 having a gap 111 to easily slide onto the user's wrist. According to this embodiment, the wristband 110 is made of a firm yet flexible material, such as a plastic, elastomeric, or synthetic material. Alternatively, the wristband 110 may be a strap that is latched to secure to the user's wrist, similar to the strapping materials and designs used in watches.

As shown, the vein-image capturing device 100 a scanning head 125, which includes a wrist sighting area 131. A long wave infrared focal plane array 140 is positioned within the scanning head 125. As shown, the long wave infrared focal plane array 140 is exposed at the wrist sighting area 131 to enable it to survey the user's wrist and to capture vein images without an external light source. The wrist sighting area 131 is positioned so that when the device 100 is worn, the wrist sighting area 131 is adjacent to (facing) the wrist of a user. The positioning of the infrared focal plane array 140, adjacent to the wrist of a user is one of the factors that allows the device to capture vein images without an external light source.

According to the invention, the long wave infrared focal plane array 140 is a sensor that includes a two dimensional array of a detector pixel matrix, mated with a silicon readout integrated circuit for infrared light, positioned in the focal plane of the optical system. The array of detectors converts the wrist vein photos into electrical signals measured by the silicon readout integrated circuit.

Figure 1B:
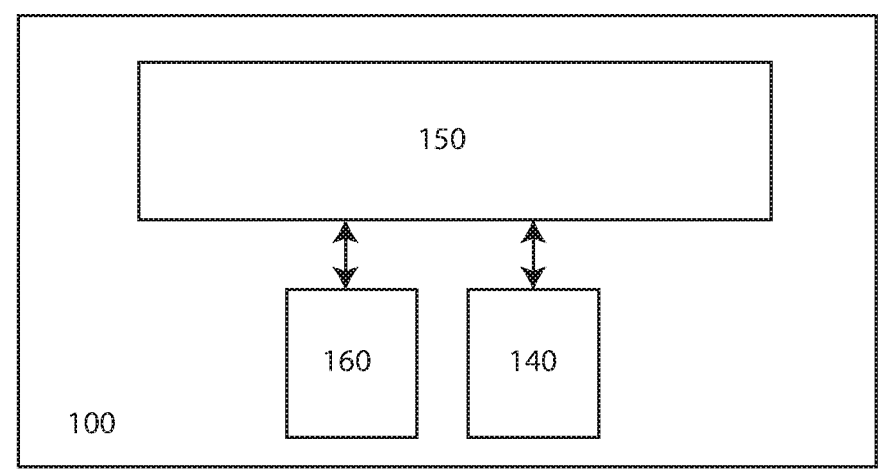
FIG. 1B is a schematic illustration of a vein-image-capturing device, according to an embodiment of the invention.

FIG. 1B is a schematic illustration of the vein-image-capturing device 100, according to an embodiment of the invention. As shown, the vein-image capturing device 100 also includes a microprocessor 150, which may be within the scanning head The microprocessor 150 capable of executing a program and processing data. The device also includes internal memory 160 to store program instructions and data necessary for the execution of the specific instructions.

The microprocessor 150 converts the captured wrist vein images, captured by the infrared focal plane array 140, into vein-image data. According to an embodiment of the invention, the microprocessor 150 may include a Scale Invariance Feature Transform (SIFT) algorithm. When a vein image is captured, unique vein features, unique to each individual user, is extracted by the SIFT algorithm. The extracted feature is then hash coded, i.e., converted into a digital string that represents that particular unique vein feature. As stated above, this hash code information (vein-image data) is one factor, the biometric factor of the three-factor authentication system outlined below.

Figure 2:
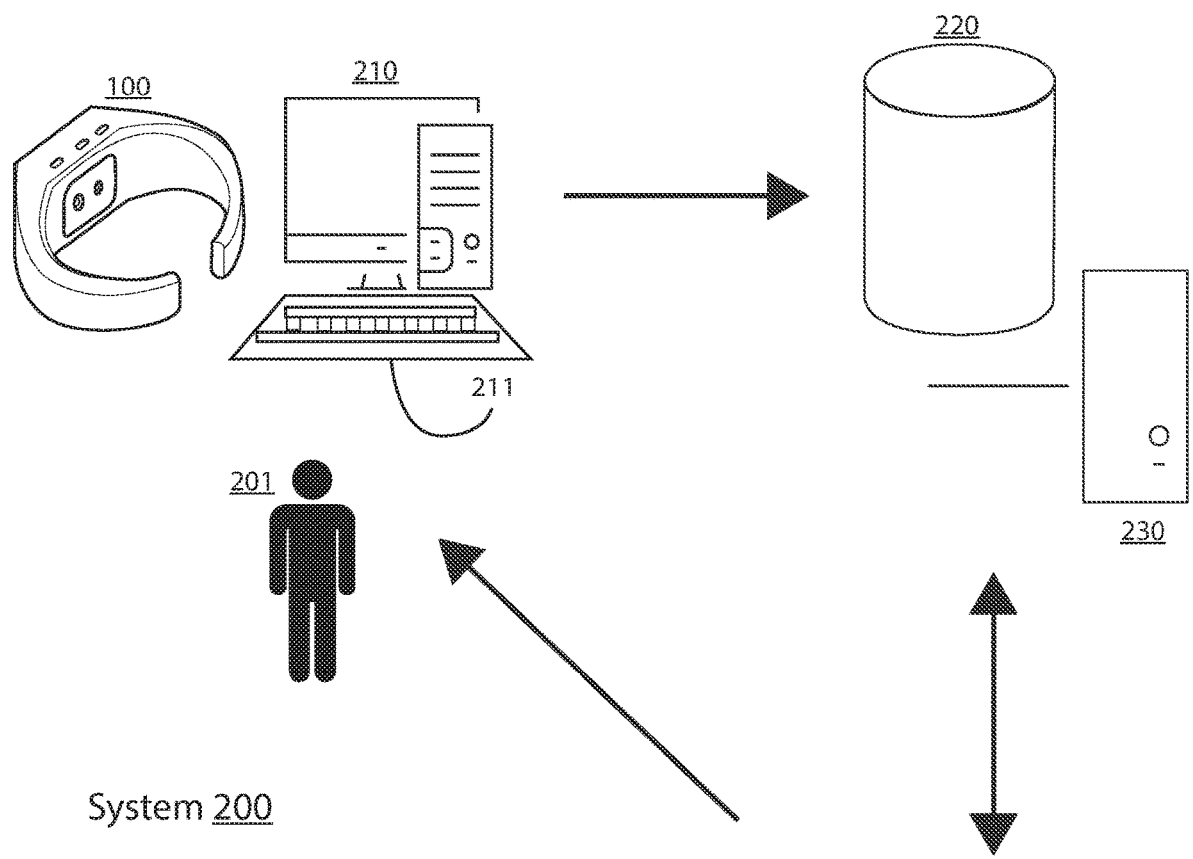
FIG. 2 is a schematic illustration of a three-factor authentication system for restricting and securing user-access to a system, according to an embodiment of the invention.

FIG. 2 is a schematic illustration of a three-factor authentication system 200 for restricting and securing user-access to a system, according to an embodiment of the invention. According the invention, the system includes information systems, physical spaces, personal computer devices, and any other devices or systems requiring controlled user access. FIG. 2 shows a user 201 who is attempting to gain access. The system 200 having a personal computer 210 for which user-access is required. It should be understood that according to the invention, access to the computer 210 may also provide access to a system of computers, network information systems, or the like. The computer 210 includes an input device 211, such as a keyboard, a keypad, an audio input, or the like for receiving a unique user PIN, and other data. The system 200 also includes the vein-image capturing device 100, a database server 220 which may be remote. The database server 220 stores information key to the authentication process, such as biometric data, unique identification numbers of vein-image capturing devices, and User PIN numbers.

According to the invention, the database server 220 includes a Registration Authority (RA) 230 for validating the three factors of data, i.e., the unique vein-image biometric data, device identification data, and user PIN data. The biometric data, unique device identification numbers, and User PIN numbers, outlined above, is reference information for users who have registered or enrolled with the registration authority 230. As outlined below the registered/enrolled information is used to validate and verify user information obtained through the authentication process. The system 200 also includes a Certificate Authority 240 for issuing certificates to grant access to the personal computer 210. Both the database server 220 and the Certificate Authority 240 may be remote from the personal computer, and transmissions among the different components of the system 200 may be wired or wireless, so long as the elements are connected and communicating.

Figure 3:
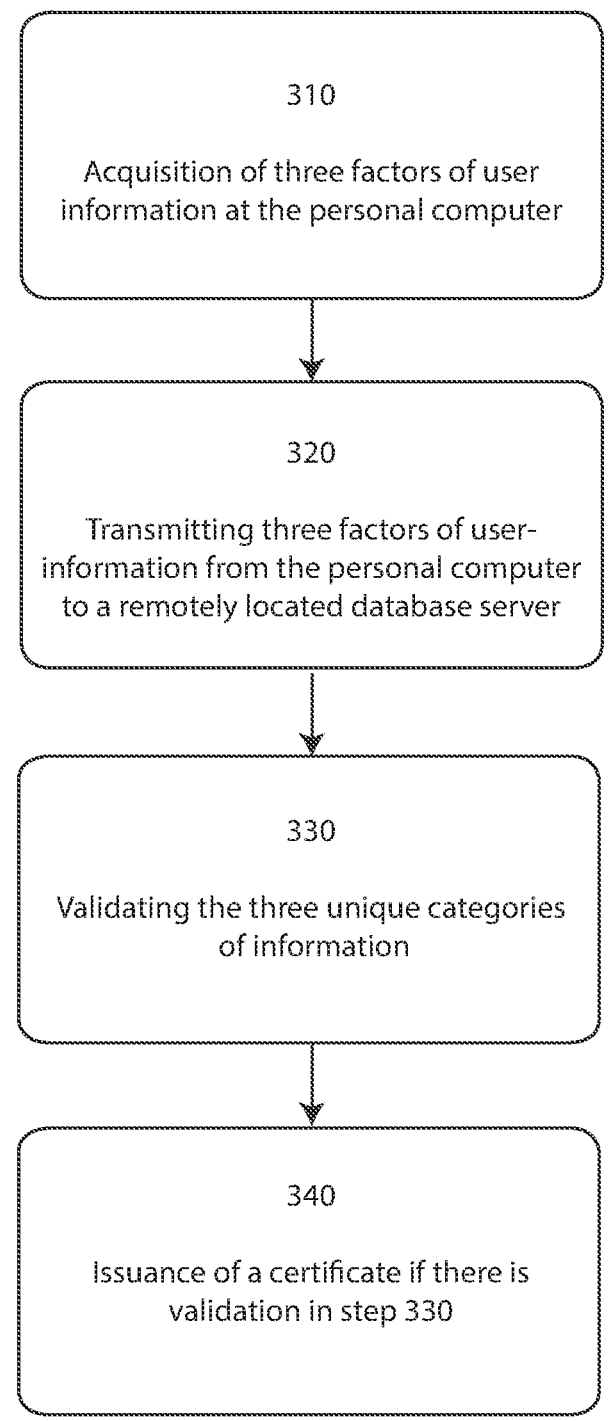
FIG. 3 is a method of three-factor authentication for restricting and securing user-access to a system, according to an embodiment of the invention.

FIG. 3 is an illustration of a method 300 of three-factor authentication for restricting and securing user-access to a personal computer, according to an embodiment of the invention. According to the method 300, a user 201 seeks access to a personal computer 210 via the three-factor authentication process. As stated above, it is within the scope of this method that access to the personal computer 210 may also provide access to a system of computers, network information systems, and the like. According to this process, step 310 is the acquisition of three factors of user information at the personal computer 210.

As outlined above, the three factors of user information include biometric data, device identification data, and user PIN data. Regarding the biometric vein-image data, as outlined above, this information is received from the wrist-worn vein-image capturing device 100. The long wave infrared focal plane array 140 positioned at the wrist sighting area 131 of the scanning head 125 scans the user's wrist and captures wrist-vein images, and the microprocessor 150 extracts a unique vein feature, which is then hash coded, i.e., converted into a digital string. That biometric data is wirelessly transmitted to the personal computer.

In addition to the biometric data, each device 100 has a unique identification number, which is also transmitted to the personal computer 210. Lastly, each authorized user has a PIN entry number that must be inputted directly into the personal computer, via an input device, such as a keyboard. Thus, these three unique categories of information are acquired by the personal computer 210.

Step 320 is the transmitting of the three factors of unique user-information from the personal computer to a remotely located database server 220. The user-information may be transmitted wirelessly to the database 220, although is also possible to transmit this information through a wired communication. As outlined above, the database server 220 includes stored information for users who have registered or enrolled with the Registration Authority 230. This stored information, critical to the authentication process, includes biometric vein-image data, identification numbers of vein-image capturing devices, and User pin numbers. The Registration Authority 230 validates the three factors of data.

Step 330 is the validating of the three unique categories of information. Using the stored information in the database, the Registration Authority 230 validates the user's unique biometric vein-image data, the user's device identification number, and the user's unique PIN number. If any of these three factors of information is not consistent with the stored information for a particular user, then there is no validation.

Step 340 is the generation of a certificate if there is validation in step 330. If there is validation, the Registration Authority 230 communicates with the Certificate Authority 240, and the Certificate Authority 240 stores, signs, and issues digital certificates for the user. The certificate is transmitted to the personal computer 210, giving the user access to the personal computer 210.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention. For example, although the system 200 may provide secure access to not only personal computers, but also to information systems, physical spaces, devices, and the like. The invention including the stated variations is intended to be defined by the following claims and their equivalents, in which all terms are meant in their broadest reasonable sense unless otherwise indicated.

What is claimed is:

1. A three-factor authentication system for restricting and securing user-access to a computer, comprising:
   a vein-image-capturing device having a unique device identification number and comprising a processor, wherein the vein-image-capturing device captures a unique vein-image of a user and processes said unique vein-image to produce unique vein-image data, wherein the vein-image capturing device is a wrist-worn device, comprising:
   a wristband for securing the device to the wrist of the user;
   a scanning head having a wrist sighting area positioned to be adjacent to the wrist of the user;
   a long wave infrared focal plane array within the scanning head and protruding at the wrist sighting area for capturing wrist vein images without an external light source, wherein the long wave infrared focal plane array comprises a two dimensional array of a detector pixel matrix positioned in a focal plane; and
   a device microprocessor within the scanning head for converting the captured wrist vein images into said unique vein-image data;
   a computer to which user access is desired, and to which said unique vein-image data and said unique device identification number is transmitted from the vein-image capturing device, and wherein said computer includes an input device to receive a user PIN;
   a remote database server having stored information therein, wherein the remote database server communicates with the computer, and wherein the computer transmits said unique vein-image data, said unique device identification number, and the user PIN to the remote database server, the remote database server having a registration authority, wherein the registration authority uses the stored information to verify said transmitted unique vein-image data, unique device identification number, and the user PIN; and
   a certificate authority for storing, signing, and issuing digital certificates, the certificate authority communicating with the registration authority, wherein after the registration authority has verified, the unique vein-image data, the unique device identification number, and the user PIN, the certificate authority issues a digital certificate to the computer so that the user gains access to the computer and said associated information system.

2. The three-factor authentication system of claim 1, wherein the unique vein-image data is hash-coded data produced in the processor of the vein-image capturing device, by using an algorithm to convert said unique vein-image of the user into said unique vein-image data.

* * * * *